United States Patent [19]

Walters

[11] 4,424,983

[45] Jan. 10, 1984

[54] IMPLEMENT COUPLING ARRANGEMENT

[76] Inventor: Douglas L. Walters, Rte. 1, Otwell, Ind. 47564

[21] Appl. No.: 325,382

[22] Filed: Nov. 27, 1981

[51] Int. Cl.$^3$ .............................................. B60S 9/08
[52] U.S. Cl. .................................. 280/475; 254/420; 280/477; 280/763.1
[58] Field of Search ............... 280/475, 477, 763, 765, 280/766; 254/45, 420; 248/246, 297.5

[56] References Cited

U.S. PATENT DOCUMENTS

| | | | |
|---|---|---|---|
| 3,166,868 | 1/1965 | Prozeller | 248/246 |
| 3,275,298 | 9/1966 | Hand | 254/45 |
| 3,863,894 | 2/1975 | Mansi et al. | 254/420 |

Primary Examiner—Joseph F. Peters, Jr.
Assistant Examiner—Donn McGiehan
Attorney, Agent, or Firm—Warren D. Flackbert

[57] ABSTRACT

An implement coupling arrangement characterized by a plate selectively positionable along an upstanding column onto which an implement connecting sleeve is slidably received, where the aforesaid plate supports a conventional jack for accomplishing vertical adjustment of the implement to a desired hitching height. The jack is arranged for rotation from a use position to a transporting position, where provision is made for maintaining the jack handle at a fixed location during transporting.

1 Claim, 5 Drawing Figures

U.S. Patent  Jan. 10, 1984  4,424,983
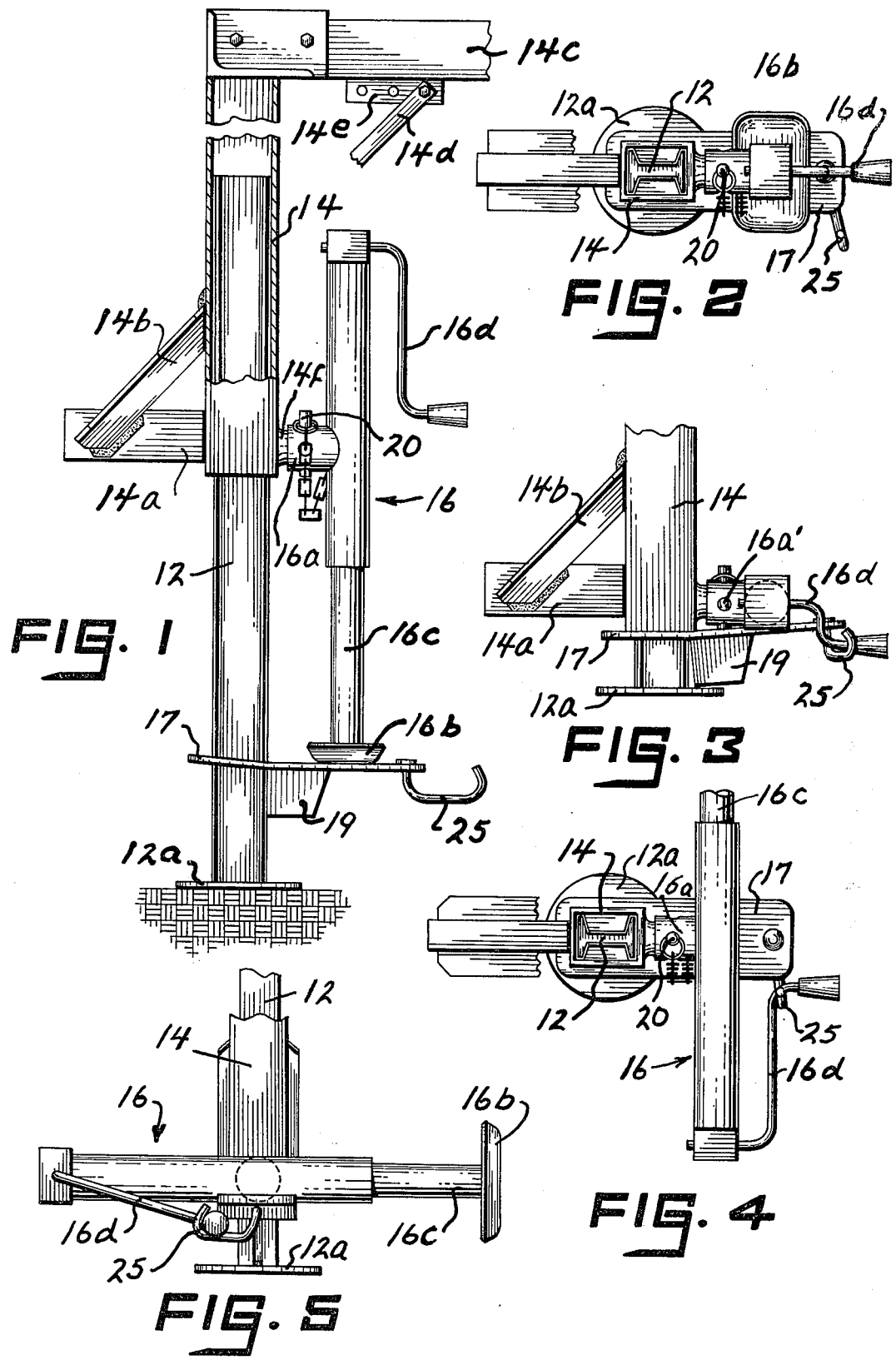

IMPLEMENT COUPLING ARRANGEMENT

As is known, the coupling or hitching of farm implements, such as plows, corn planters, cultivators and the like, to a tractor or other powered pulling equipment oftentimes is troublesome, mostly requiring the use of an independent jack for elevating or height adjustment purposes and/or to maintain the equipment at a storage location. The preceding proves objectionable due to differences in terrain level, i.e. uneven ground, limitations as to the height adjustment range, and other factors inherent with agricultural usage.

The invention overcomes the aforesaid problems by providing an implement coupling arrangement characterized, principally, by an implement connected sleeve slidably mounted on a column mounted on a base resting on the ground or other surface. A plate, adjustably movable along the column and positioned by self-wedging action, supports a conventional jack, where the latter is positionable, by rotation, from a use position to a transporting position, and conversely. The jack operatively connects to the aforesaid sleeve so that by jacking action, the sleeve, and thus the implement, may be vertically adjusted for proper tractor or like coupling or hitching.

When in a transporting position, the arrangement is such that the jack handle is maintained at a fixed location, i.e. is incapable of unwanted movement. The latter is accomplished by a hanger mounted on the aforesaid plate. In any event, and typically, a pin may be employed to assure positive placement for transporting after coupling has been achieved.

A better understanding of the present invention will become more apparent from the following description, taken in conjunction with the accompanying drawing, wherein FIG. 1 is a view in side elevation, partly fragmentary and partly in section, showing an implement coupling arrangement in accordance with the teachings of the present invention;

FIG. 2 is a top plan view of the invention, where certain portions of a typical implement hitching assembly is removed;

FIG. 3 is a view in end elevation showing the instant coupling arrangement in a transporting position;

FIG. 4 is a top plan view of the coupling arrangement of the invention in the transporting position of FIG. 3; and, FIG. 5 is a view in side elevation of the invention, again in the transporting position.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the implement coupling arrangement of the invention is defined by an upstanding column 12, in the general form of an I-beam, mounted on a base 12a supported on the ground or other receiving surface. A sleeve 14 is slidably received on the column 12, such typically forming part of an assembly extending between the implement (not shown) and a tractor or other powered pulling equipment (also not shown). The illustrated assembly, which is representative, may include a connecting arm 14a, with associated bracing 14b, and another connecting arm 14c, extending in the direction of the tractor, and also including bracing 14d and an adjustment plate 14e for the latter.

In any event, the sleeve 14 has an outwardly extending portion 14f proximate the lower end thereof which receives a connector 16a extending from a conventional jack 16, the latter including a jack base 16b at the bottom of a movable shaft 16c and a jack handle 16d. The jack base 16b is seated on an angled plate 17 which is movable along the column 12 and locked at a desired position by self-wedging action occasioned by the weight of the jack 16.

As apparent in FIGS. 1 and 3, a web 19, disposed beneath the plate 17, serves reinforcing purposes. While not critical, the plate 17 is typically angled in the realm of 5° from horizontal, also apparent in FIGS. 1 and 3. The assembly further includes a pin 20 cooperating with openings 16a' in the connector 16a and at least one opening (not apparent) in the outwardly extending portion 14f.

The arrangement of the invention affords two principal use positions, i.e. a vertical position, shown in FIGS. 1 and 2, wherein the appropriate hitching or coupling level can be achieved, or a horizontal position, serving transporting or after hitching or coupling purposes, shown in FIGS. 3, 4 and 5. Pin 20 is optionally employed (even though shown) in the vertical use position, but desired for positive placement during the transporting position.

In any event, the invention is simple but yet effective in usage. In this connection, the angled plate 17 is raised along the column 12 to a preselected height, where the jack base 16b weight thereupon achieves a wedging action between the angled plate 17 and the column 12 (see FIG. 1). The jack handle 16d is then rotated, causing the sleeve 14 to raise upwardly or downwardly, as necessary, to achieve coupling or hitching, through the cooperative effect achieved between the extending portion 14f of the sleeve 14 and the connector 16a of the jack 16.

In other words, the implement is readily placed in condition for tractor connection, irrespective of ground level or other environmental factors. Actually, the arrangement of the invention also takes the place of a conventional jack which has heretofore been employed, in many instances, to maintain or support the implement at a non-use condition.

After the desired coupling or hitching has been achieved, the jack base 16b, on movable shaft 16c, is raised from the aforesaid engaging relationship with the angled plate 17 through operation of jack handle 16d. Pin 20, if employed, is released and the jack rotated 90° to the position of FIGS. 3, 4 and 5. Thereafter, the angled plate 17, including the web 19, is moved upwardly on the column 12 into engagement with the lower end thereof as shown in FIG. 3, where, also, the base 12a is moved into engagement with web 19 to present overall compactness. The angled plate 17 now assumes a different position from that shown in FIG. 1.

As evident in each of the figures, a hanger 25 is disposed on the angled plate 17 adjacent the outer edge thereof. The principal purpose of hanger 25 is to retain jack handle 16d in a positive location when the arrangement is at a transporting position. In other words, the hanger 25 has a particular configuration, evident, for example, in FIGS. 3 and 5, making such adaptable to receiving the end portion of jack handle 16d.

In any event, and from the preceding, it should be evident that the coupling arrangement presented by the invention effectively serves coupling or hitching purposes and yet, at the same time, is rotatable to a compact and/or out of the way transporting position. As mentioned, the latter relationship is particularly shown in FIG. 3, where the pulled implement, being already attached to the tractor, is not dependent at such time upon usage of the invention. Positive vertical adjustment is achieved due to jack base placement on the angled plate, in contrast to use on uneven ground or the like.

The implement coupling arrangement described hereabove is susceptible to various changes within the spirit of the invention as, for example, proportioning; whether or not the slidable sleeve is a fixed or detachable part of the implement; the configuration of the angled plate; the particular form of jack employed; and, the like. Thus, the preceding should be considered illustrative and not as limiting the scope of the following claims:

I claim:

1. A coupling arrangement between an implement and a driving vehicle comprising a base supported upstanding column positioned on a receiving surface, a sleeve slidable on said upstanding column and forming part of a connecting assembly between said implement and said driving vehicle, a freely movable angled plate with an underlying web selectively wedged along said upstanding column at a desired operative location and having a hanger extending therefrom, a jack selectively separable from said sleeve and having a base supported by said angled plate, the weight of said jack wedging said angled plate and said web against said column, said sleeve and said jack having cooperating extending portions whereby said jack is freely rotatable with respect to said sleeve from a first vertically adjustable position to a second lateral transporting position when said angled plate and said underlying web abut the bottom of said sleeve and the bottom of said base supported upstanding column, and removable means maintaining said jack at said second lateral transporting position, and said jack having a handle received on said hanger at said second lateral transporting position.

* * * * *